Patented July 20, 1948

2,445,521

UNITED STATES PATENT OFFICE 2,445,521

COMPOSITION FOR COLD WATER CEMENT PAINT

John G. Franco, Cristobal, C. Z.

No Drawing. Application November 12, 1946, Serial No. 709,101

2 Claims. (Cl. 106—92)

This invention relates to so-called cold water paints, and more particularly to a cold water miscible cement paint composition intended primarily for application to cement and masonry structures.

It is a principal object of the invention to provide a cold water miscible cement paint composition consisting primarily of Portland cement combined with other ingredients which serve to control the setting rate and hardening rate of the paint, and a further ingredient which functions to prevent settling of the ingredients when the mixture is combined with water preparatory to application to a structure to be painted.

It is a further object of the invention to provide a novel and advantageous cement paint mixture of the type described comprising about 99% Portland cement with fractional percentages of potato starch, rice flour, and sodium chloride, which combination of ingredients has been found to provide, when mixed with water in suitable proportions, a paint which remains in good condition for application during the time required to apply it, and which sets and hardens into an extremely durable coating which becomes substantially a part of the structure painted.

Numerous cement paints have been proposed in the past, and many of them have been marketed. These prior cement paints have, however, possessed one or more of several disadvantages. One such paint has consisted of approximately equal proportions of hydrated lime and cement, together with minor percentages of other ingredients. Such paints containing lime have been found to lack durability in use, the lime constituent apparently contributing to the ease with which such paint may be flaked-off of the surface to which it is applied, due to weathering or other causes.

Other cement paints proposed or used in the past have been difficult to apply due to the rapidity with which the material begins to set after admixture with water, and still others have been unsatisfactory for the reason that the ingredients do not remain suspended in the aqueous medium, but tend to begin settling out of suspension as soon as stirring is discontinued.

The particular combination of ingredients employed in accordance with the present invention has been found to result in a mixture which, when suspended in water, will remain in good condition for application to the structure to be painted over an adequate period of time to insure ease of application either by brush or spray. Moreover, the hardening rate is such as to produce a coating of maximum hardness and durability and which becomes substantially a part of the structure upon which it is coated, is extremely resistant to flaking-off, and possesses high wearing qualities.

According to the present invention, the preferred mixture comprises the following ingredients in substantially the proportions as set forth below. All percentages are by weight.

| | Percent |
|---|---|
| Portland cement | 99.338 |
| Potato starch | 0.530 |
| Rice flour | 0.0993 |
| Sodium chloride | 0.0327 |

It is recognized that in the preparation of such a mixture in commercial quantities, the exact proportions specified above are rather difficult to maintain, and that slight variations will occur. Nevertheless, it has been ascertained that the exact proportions set forth above produce the optimum result.

In compounding the aforesaid mixture, the rice flour to be used should be passed through a 400-mesh screen. The ingredients are then combined in any suitable device for mixing dry materials and are mixed until they are completely distributed, or in other words, until a uniform mixture is obtained. This mixture may then be stored in waterproof bags until it is to be used, and will not deteriorate in any way.

The mixture prepared as stated above may be combined with water for use as a paint in the following manner. Seven pounds of the mixture are stirred into one quart of water until a smooth paste is formed. Sufficient additional water is then added to bring the total volume to one gallon, and the mixture is stirred until uniform. The liquid suspension which results should then be permitted to stand for ten minutes before use. It may then be applied in the same manner as any of the cold water paints now in use.

Certain variations in the composition of the mixture may be permitted. For example, the proportion of potato starch employed may range from 0.350% to 0.750%, while the rice flour content may vary between .02% and about 0.37%. The sodium chloride content may range from .01% to about .04%. In any case, the Portland cement content will be approximately 99.0% or slightly higher, the optimum value being, as stated above 99.338%.

It has been found that the potato starch functions to promote the admixture of ingredients with water to form a sufficiently stable suspension to permit of its use as a paint. If the starch is omitted, the remaining ingredients rapidly settle in the container and cannot be satisfactorily applied to the work.

The rice flour appears to serve to retard the hardening rate of the paint, thereby promoting hardness and toughness of the coating. As is well known, a cement mixture, if allowed to harden too rapidly, loses strength and hardness.

The sodium chloride is employed to retard the setting rate of the cement, thereby keeping the aqueous suspension in a sufficiently fluid form for easy application during the painting operation. It has been found that omission of any of the three minor ingredients results in an inferior product for one or another of the foregoing reasons.

Having thus described the invention, what is claimed as new and desired to be secured by Letters Patent is:

1. A cold water miscible cement paint mixture comprising, by weight, 99.338% Portland cement, 0.530% potato starch, 0.0993% rice flour and 0.0327% sodium chloride.

2. A cold water miscible cement paint mixture comprising, by weight, about 99.0% Portland cement with the remainer consisting of 0.35% to 0.75% potato starch, .02% to 0.37% rice flour and .01% to .04% sodium chloride.

JOHN G. FRANCO.

REFERENCES CITED

The following references are of record in the file of this patent:

UNITED STATES PATENTS

| Number | Name | Date |
|---|---|---|
| 771,479 | Lewis | Oct. 4, 1904 |
| 1,157,234 | Lester | Oct. 19, 1915 |

FOREIGN PATENTS

| Number | Country | Date |
|---|---|---|
| 357,119 | Great Britain | 1931 |